May 3, 1932.  E. J. SOVATKIN  1,856,295
PELVIMETER
Filed Oct. 2, 1928
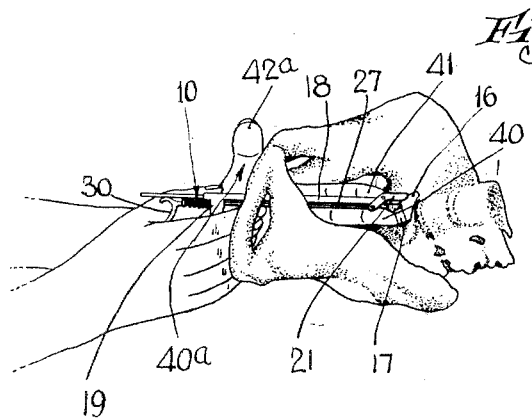
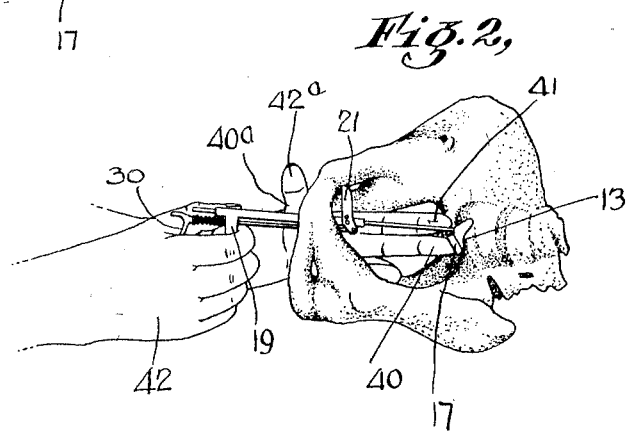
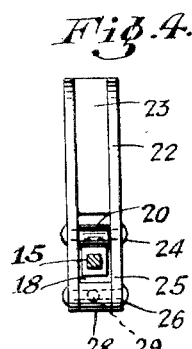
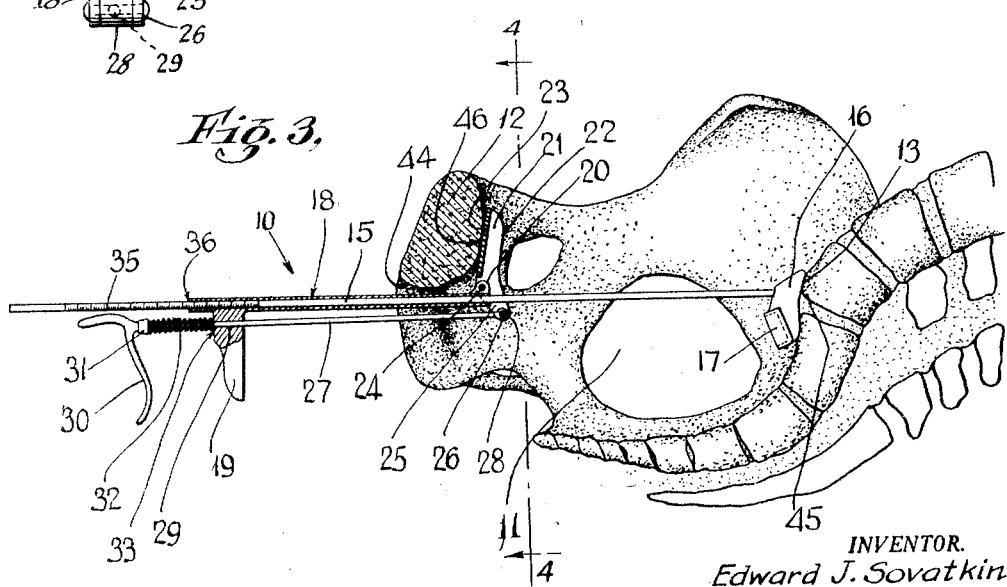
INVENTOR.
Edward J. Sovatkin
BY
ATTORNEY.

Patented May 3, 1932

1,856,295

UNITED STATES PATENT OFFICE

EDWARD J. SOVATKIN, OF BROOKLYN, NEW YORK, ASSIGNOR TO J. SKLAR MANUFACTURING CO. INC., OF NEW YORK, N. Y., A CORPORATION OF NEW YORK

PELVIMETER

Application filed October 2, 1928. Serial No. 309,784.

This invention relates to pelvimeters. More particularly it relates to an instrument for measuring the internal conjugate.

An object of the invention is to provide an instrument of the character described, which shall measure the true obstetric conjugate directly.

A further object of this invention is to provide an improved instrument of the character described, which may be carried into the patient's vagina and manipulated for obtaining the desired measurements without pain or injury to the patient.

Another object of the invention is to provide a rugged and compact device of the character described, which shall comprise few and simple parts, which shall be inexpensive to manufacture, and easy to operate, and which shall be accurate, practical, and highly efficient in use.

Other objects of this invention will in part be obvious and in part hereinafter pointed out.

The invention accordingly consists in the features of construction, combinations of elements, and arrangement of parts, which will be exemplified in the construction hereinafter described, and of which the scope of application will be indicated in the following claims.

In the accompanying drawings, in which is shown one of the various possible illustrative embodiments of this invention, Fig. 1 is a perspective view of the device showing the method of introducing the folded pelvimeter into the pelvis;

Fig. 2 is a perspective view of the device in measuring position;

Fig. 3 is an enlarged partial cross sectional view of the device in measuring position; and Fig. 4 is a cross-sectional view taken on line 4—4 of Fig. 3.

Referring in detail to the drawings, 10 designates the pelvimeter embodying the invention. This instrument is adapted to be introduced into the vagina to measure the internal conjugate. This measurement is important in the physical examination of pregnant women and forms one of the internal measurements usually obtained in the examination of the pelvis. By these internal measurements, the physician is enabled to learn the size of the smallest outlet through which the newborn babe must pass at birth. As illustrated in the drawings, the instrument is introduced into the pelvic cavity 11 and measures the distance from the pubis 12 to the sacral promontory 13.

The instrument 10 consists of a small but rigid bar 15, preferably of rectangular cross-section. The bar may be made of steel or any other suitable metal. Said bar 15 carries a saddle shaped member 16 at one end thereof attached thereto in any suitable manner. Said member 16 is formed with a thimble 17 opening toward the bar 15, and adapted to receive the tip of the middle finger, as will hereinafter appear.

A sleeve member 18 is slidably mounted on said bar 15. Said sleeve 18 is considerably shorter than said bar 15, and is provided with a depending handle 19 adjacent one end thereof, and with a pair of spaced upstanding apertured lugs 20 at the opposite end thereof. Said lugs 20 serve as bearings for pivotally mounting a channel shaped member 21 which comprises parallel side walls 22 connected by a front wall 23 and by a pin 24 journaled in said bearings 20 to provide the pivot for said member. Said walls 22 are formed with integral depending portions 25 straddling said sleeve 18 and bar 15 and connected adjacent their lower end by a cross pin 26. Means is provided for rotating the member 21 about its pivot 24. To this end an actuating rod 27 is formed with an apertured annular enlargement 28 at one end thereof which receives the pin 26 to form a pivotal connection therewith. Said rod 27 extends through an opening 29 in handle 19 to permit reciprocation of said rod with respect to said handle. The opposite end of said rod 27 is provided with a curved handle 30 shaped to form a palm rest, as will hereinafter appear.

Said handle 30 is formed with a boss 31, and a small coil compression spring 32 is mounted on the rod 27 between the front wall 33 of handle 19 and said boss. It will now be apparent that when the handles 19 and 30 are grasped in the palm of the hand, pressure on the palm rest 30 with the thumb will rotate the member 21 from a horizontal to a vertical position as illustrated in Figs. 1 and 2 respectively.

Centimeter calibration marks 35 on the side or upper surface of bar 15 may be read at a point 36 where the end of sliding sleeve 18 meets the bar.

The pelvimeter is made as slim as possible, and the parts so proportioned that when the member 21 is folded down, the whole device is about the diameter of a man's finger. Thus it may be carried into the vagina without causing pain.

In using the instrument, the middle finger 40 of the examining hand 40a is slipped into the thimble 17. The instrument well lubricated, is now carried into the vagina by the extended middle finger 40 and index finger 41. The examiner then locates the promontory of the sacrum 13 with the middle finger which may be slipped out of the thimble temporarily for this purpose. With the middle finger in the thimble 17, the saddle shaped member 16 is now seated over the sacral promontory. The other hand 42, grasping the handle 19, slides the sleeve 18 within the vagina, with the member 21 folded down. The handle 19 does not enter the vagina. Fig. 1 illustrates the position of the instrument at this stage.

Pressure on the palm rest 30 with the thumb 42d against the tension of spring 32 will raise the member 21 to a right angle position. Holding the member 21 firmly in this position and with the bar 15 against the under surface 44 of the pubic arch, the handle 19 is drawn outward until the arm 21 is pressed firmly against the posterior surface 46 of the os pubis. The instrument may then be read directly at the last figure showing under the sleeve 18 at the point 36.

The calibration 35 is not calculated straight along the bar 15. The figures on scale 35 represent the distances from a point 45 in the curve of the saddle shaped member 16, i. e. from the point where said member touches the sacral promontory 13 to the point 46 which is 2.5 centimeters up from the arm 21 above the sleeve 18. This point 46 is the point where numerous tests show that the arm generally touches the most posterior point of the os pubis 12. In other words, the scale 35 gives the length of the imaginary hypothenuse 45, 46, of the triangle 45, 24, 46. That hypothenuse, when the instrument is in place, is the true obstetric conjugate, and its length may be read directly on the scale 35.

It will thus be seen that there is provided a device in which the several objects of this invention are achieved, and which is well adapted to meet the conditions of practical use.

As various possible embodiments might be made of the above invention, and as various changes might be made in the embodiment above set forth, it is to be understood that all matter herein set forth or shown in the accompanying drawings is to be interpreted as illustrative, and not in a limiting sense.

Having thus described my invention, I claim as new and desire to secure by Letters Patent:

1. A pelvimeter comprising a member insertable into the vagina, a sleeve slidably mounted on said member, said member having calibrations thereon readable at varying positions of said sleeve to measure the true obstetrical conjugate.

2. In a pelvimeter, a rod, a member slidably mounted on said rod, an arm pivotally mounted on said member, and a spring normally maintaining said arm in folded position substantially parallel to and closely adjacent said rod.

3. In a pelvimeter, a rod, a member slidably mounted on said rod, an arm pivotally mounted on said member, a spring normally maintaining said arm in folded position substantially parallel to said rod, and means connected to said arm for raising said arm against the tension of said spring.

4. A pelvimeter of the character described comprising a rod having a member at one end thereof adapted to engage the sacral promontory, a member slidably mounted on said rod and a member mounted on said first member adapted to contact the inner portion of the pubis.

5. A pelvimeter of the character described comprising a rod having a member at one end thereof adapted to engage the sacral promontory, said member having a thimble shaped portion adapted to receive a finger tip.

6. In a pelvimeter, in combination, a rod, a member slidably mounted on said rod, an arm pivotally mounted on said member, and means for normally maintaining said arm in folded position alongside said rod.

7. In a pelvimeter, in combination, a rod, a member slidably mounted on said rod, an arm pivotally mounted on said member, means for normally maintaining said arm in folded position alongside said rod, and means for raising said arm.

8. In a device of the character described, in combination, a rod, a member slidably mounted on said rod, an arm pivotally mounted on said member, means for normally maintaining said arm folded against said rod, means for raising said arm, and means for moving said member with respect to said rod.

9. In a device of the character described, in combination, a rod, a thimble shaped member fixed to one end of said rod, a member slidably mounted on said rod, said rod having calibrations on the opposite end thereof.

10. A pelvimeter comprising a rod, a member slidably mounted on said rod, an arm pivoted to said member, a connecting member slidably mounted on said first member and pivoted to said arm at a point spaced from said first named pivotal connection.

11. A pelvimeter comprising a rod, a sleeve slidably mounted on said rod, said sleeve having an integral projection adjacent one end thereof, an arm pivoted to said sleeve adjacent the opposite end thereof, and a member slidably mounted on said projection pivoted to said arm at a point spaced from said first named pivotal point.

12. A pelvimeter comprising a rod, a sleeve slidably mounted on said rod, said sleeve having an integral projection adjacent one end thereof, an arm pivoted to said sleeve adjacent the opposite end thereof, a member slidably mounted on said projection pivoted to said arm at a point spaced from said first named pivotal point, a handle on said member and a spring interposed between said handle and projection.

13. A pelvimeter comprising a rod, a sleeve slidably mounted on said rod, said sleeve having an integral projection adjacent one end thereof, an arm pivoted to said sleeve adjacent the opposite end thereof, a member slidably mounted on said projection and pivoted to said arm at a point spaced from said first named pivotal point, a handle on said member and a spring interposed between said handle and projection, said rod having a portion adapted to receive a finger tip, at one end thereof.

14. A pelvimeter comprising a rod, a sleeve slidably mounted on said rod, said sleeve having an integral projection adjacent one end thereof, an arm pivoted to said sleeve adjacent the opposite end thereof, a member slidably mounted on said projection pivoted to said arm at a point spaced from said first named pivotal point, a handle on said member, a spring interposed between said handle and projection, said rod having a portion adapted to receive a finger tip, at one end thereof, said rod having calibrations thereon adapted to cooperate with said sleeve, at the other end thereof.

15. A pelvimeter comprising an elongated rod, a member slidably mounted thereon, an arm pivoted to said member and movable to a position substantially parallel to said rod, and means for normally retaining said arm substantially parallel to said rod.

16. A pelvimeter comprising an elongated rod, a member slidably mounted thereon, an arm pivoted to said member, means for normally retaining said arm substantially parallel to said rod, and means for moving said arm to a position at an angle to said rod.

In testimony whereof I affix my signature.

EDWARD J. SOVATKIN.